(12) United States Patent
Shang et al.

(10) Patent No.: US 11,485,306 B2
(45) Date of Patent: Nov. 1, 2022

(54) RESCUE DEVICE FOR ADJUSTING DIRECTION OF AUTOMOBILE FALLING INTO WATER THROUGH BUOYANCY

(71) Applicant: Shaanxi University of Science & Technology, Xi'an (CN)

(72) Inventors: Xianru Shang, Xi'an (CN); Zijian Liu, Xi'an (CN)

(73) Assignee: Shaanxi University of Science & Technology, Xi'an (CN)

(*) Notice: Subject to any disclaimer, the term of this patent is extended or adjusted under 35 U.S.C. 154(b) by 0 days.

(21) Appl. No.: 17/445,417

(22) Filed: Aug. 19, 2021

(65) Prior Publication Data
US 2022/0185215 A1 Jun. 16, 2022

(30) Foreign Application Priority Data
Dec. 16, 2020 (CN) .......................... 202011481863.7

(51) Int. Cl.
*B60R 21/01* (2006.01)
*B60R 21/00* (2006.01)

(52) U.S. Cl.
CPC ...... *B60R 21/01* (2013.01); *B60R 2021/0016* (2013.01); *B60R 2021/01211* (2013.01)

(58) Field of Classification Search
CPC ............ B60R 21/02; B60R 2021/0016; B60R 2021/01211; B60R 21/00; B60R 21/01
See application file for complete search history.

(56) References Cited

U.S. PATENT DOCUMENTS

| | | | | |
|---|---|---|---|---|
| 8,695,521 | B2 * | 4/2014 | Dondurur ............. | B60F 3/0038 |
| | | | | 114/123 |
| 2003/0197599 | A1 * | 10/2003 | Kim ..................... | B63C 9/24 |
| | | | | 340/573.6 |
| 2006/0043712 | A1 * | 3/2006 | Hakki .................... | B60R 21/36 |
| | | | | 280/735 |
| 2017/0341610 | A1 * | 11/2017 | Tu ........................ | B60R 21/02 |
| 2020/0254949 | A1 * | 8/2020 | Kagulian ............... | B60R 21/00 |

FOREIGN PATENT DOCUMENTS

| | | | | |
|---|---|---|---|---|
| CN | 103507737 | A | * | 1/2014 |
| CN | 204172840 | U | * | 2/2015 |
| CN | 106740629 | A | * | 5/2017 |
| CN | 106882140 | A | * | 6/2017 |
| CN | 106945623 | A | * | 7/2017 |

(Continued)

*Primary Examiner* — Paul N Dickson
*Assistant Examiner* — Kurtis Nielson
(74) *Attorney, Agent, or Firm* — Oblon, McClelland, Maier & Neustadt, L.L.P.

(57) ABSTRACT

Disclosed is a rescue device for adjusting the direction of an automobile falling into water through buoyancy. The rescue device comprises an automobile body, wherein storage cavities are formed in the automobile head and the automobile tail of the automobile body, a first high-pressure quick inflation pump is embedded in the inner wall of the storage cavity, a square buoyancy air bag is folded and stored in the storage cavity, an annular storage box body is embedded in a shell of the automobile body, meanwhile, the annular storage box body is located on the side close to the driving position of the automobile body, and an annular buoyancy air bag is folded and stored in the annular storage box body.

8 Claims, 4 Drawing Sheets

(56) References Cited

FOREIGN PATENT DOCUMENTS

| CN | 108357454 | A | * | 8/2018 | ............. | B60R 21/02 |
| CN | 108501850 | A | * | 9/2018 | | |
| CN | 108725364 | A | * | 11/2018 | ............. | B60R 21/00 |
| CN | 109455161 | A | * | 3/2019 | | |
| CN | 210760622 | U | * | 6/2020 | | |
| DE | 20302095 | U1 | * | 7/2003 | ............. | B60R 21/02 |
| KR | 20020055818 | A | * | 7/2002 | | |
| KR | 20050037744 | A | * | 4/2005 | | |

* cited by examiner

RESCUE DEVICE FOR ADJUSTING DIRECTION OF AUTOMOBILE FALLING INTO WATER THROUGH BUOYANCY

CROSS REFERENCE TO RELATED APPLICATION(S)

This patent application claims the benefit and priority of Chinese Patent Application No. 202011481863.7, filed on Dec. 16, 2020, the disclosure of which is incorporated by reference herein in its entirety as part of the present application.

TECHNICAL FIELD

The present disclosure belongs to the technical field of protective devices when automobiles fall into water, and specifically relates to a rescue device for adjusting the direction of an automobile falling into water through buoyancy.

BACKGROUND ART

Along with the development of science and technology, automobiles have been rapidly developed to a high level, existing automobiles not only have the function of riding instead of walking, but also have a powerful function in the aspect of safety performance, generally, a common safety protection device of the automobile is a safety air bag which is popped up when the automobile is collided, and a driver is protected to a certain degree; however, the safety air bag only aims at the situation that collision happens when the automobile runs on the road surface, once the automobile falls into water, people in the automobile are difficult to open automobile doors to escape due to the action of water pressure, and particularly when the automobile is completely overturned and falls into the water with the bottom facing upwards, people in the automobile are more difficult to escape.

Disclosed are a water-falling anti-sinking protection device and an automobile with the publication number of CN106740629 A. The water-falling anti-sinking protection device comprises an air storage tank and a plurality of air bags, wherein the air bags are arranged on a chassis, the top and the positions between front tires and rear tires on the two sides of the automobile respectively, and each air bag communicates with the air storage tank through an air guide pipe; an inflation control valve is installed at the position, close to an air outlet of the air storage tank, of the air guide pipe and electrically connected with an automobile controller, and a water detection element is installed on the chassis of the automobile and electrically connected with the automobile controller; when the automobile runs normally, all the air bags are not inflated and are arranged at the chassis, the top and the two sides of the automobile; furthermore, an air pump is arranged at the position close to the head of the automobile and is in transmission connection with an automobile engine through an electromagnetic clutch. Triggering of the air bags at all positions is started through the water detection elements installed on the chassis, the air bags at all positions can be directly triggered only when the chassis of the automobile is in contact with the water surface, but once the chassis of the automobile falls into the water upwards, the water detection elements of the chassis cannot be in contact with the water immediately, so that the air bags cannot be rapidly triggered and started; and although the air bag is arranged on the roof, when the chassis is upward and falls into water, the air bag on the roof can only generate buoyancy to the automobile, but the automobile is still in the posture that the chassis is upward, the automobile doors on the two sides of the automobile are likely to be in contact with the water surface or immersed into the water, and the head of a driver in the automobile is downward, so that escape of people in the automobile cannot be guaranteed. Meanwhile, the air pump is electrically connected with a power supply element of the automobile, that is, before the automobile collides and rushes into water, when the power supply element of the automobile is damaged due to collision, the air pump is completely impossible to be started, and the automobile cannot be driven by the air bag to float upwards.

SUMMARY

In order to overcome the defects in the prior art, the present disclosure aims to provide a rescue device for adjusting the direction of an automobile falling into water through buoyancy, and the rescue device has the characteristic that when a chassis of the automobile is upward and falls into water, an annular buoyancy air bag is automatically unfolded, so that the automobile is overturned to the driving position under the action of buoyancy and the automobile door is upward.

To achieve the above purpose, the technical scheme adopted by the present disclosure is as follows: the rescue device for adjusting the direction of an automobile falling into water through buoyancy comprises an automobile body, wherein storage cavities are formed in the automobile head and the automobile tail of the automobile body; a first high-pressure quick inflation pump is embedded in the inner wall of the storage cavity; a square buoyancy air bag is arranged in an inner cavity of the storage cavity; the square buoyancy air bag and an air outlet of the first high-pressure quick inflation pump are connected through a first one-way air valve; a sealing cover is arranged at an end port of the storage cavity; the inner walls of the upper end and the lower end of the sealing cover are fixedly connected with elastic plastic buckles; the elastic plastic buckles are clamped at the upper inner wall and the lower inner wall of the storage cavity; first pressure induction switches are embedded in the bottom side walls of the automobile head and the automobile tail of the automobile body; the first pressure induction switch is electrically connected with the first high-pressure quick inflation pump; a shell of the automobile body is internally provided with an annular storage box body, the annular storage box body is distributed around the automobile body, and the annular storage box body is located on the side close to the driving position of the automobile body; an end port of the annular storage box body is sealed through a plastic cover; an annular buoyancy air bag is arranged in an inner cavity of the annular storage box body, and the annular buoyancy air bag is folded and stored; second high-pressure quick inflation pumps are arranged at the bottom of the inner cavity of the annular storage box body; a second one-way air valve is arranged at an air outlet port of the second high-pressure quick inflation pump and is connected with the annular buoyancy air bag through an inflation hose; a movable cavity is formed in the outer wall of the top of the automobile body; a heavy metal block is embedded in the upper side in the movable cavity; vertical strip-shaped sliding grooves are formed in the positions, close to the lower sides, of the left inner wall and the right inner wall of the movable cavity; a sliding plate is horizontally fixed at the bottom of the heavy metal block; the left end and the right end of the sliding plate are slidably connected to the bottoms of the strip-shaped sliding grooves; electric telescopic rods are horizontally fixed to the positions, close to the upper ends, of the left inner wall and the right inner wall of the movable cavity; the telescopic end of the electric telescopic rod is inserted into the heavy metal block in a penetrating mode; a vertical first strip-shaped cavity is formed in the position, where the electric telescopic rod is located, of the inner wall of the automobile body; a second pressure induction switch is arranged at the top of an inner cavity of the first strip-shaped cavity; the second pressure induction switch is electrically connected with the electric telescopic rod; and a steel ball is placed at the bottom of the inner cavity of the first strip-shaped cavity.

Vertical second strip-shaped cavities are formed in the positions, where the first high-pressure quick inflation pump and the second high-pressure quick inflation pump are located, of the inner wall of the automobile body, and all of the second strip-shaped cavities and the first strip-shaped cavities are provided with electric power storage mechanisms; the electric power storage mechanism comprises a piezoelectric plate and a storage battery block, the piezoelectric plates are horizontally installed at the bottoms of the inner cavities of the first strip-shaped cavities and the second strip-shaped cavities, and the steel ball is arranged in the inner cavity of each second strip-shaped cavity in a matched mode; the storage battery block is electrically connected with the first high-pressure quick inflation pump, the second high-pressure quick inflation pump and the electric telescopic rod; and the piezoelectric plate is electrically connected with the storage battery block through a charger.

Silencing cotton bodies are arranged on the bottom side walls of the inner cavities of the first strip-shaped cavity and the second strip-shaped cavity.

Balls are uniformly embedded on the side wall of the telescopic end of the electric telescopic rod.

A rubber sealing ring is adhered to the side wall of the upper end of the heavy metal block in a surrounding mode.

Channels are vertically formed in the heavy metal block, and a connecting rod is vertically inserted into the channel in a penetrating mode; the lower end of the connecting rod is connected with the bottom of the inner cavity of the movable cavity; a rubber block is arranged at the upper end of the connecting rod; the rubber block is embedded at the upper end of the channel; liquid induction switches are installed on the left inner wall and the right inner wall of the channel in an embedded mode; and the liquid induction switch is electrically connected with the second high-pressure quick inflation pump, and the inner diameter of the channel is larger than the width of the rubber block.

The inner wall of the strip-shaped sliding groove is coated with a smoothing agent.

Grooves are formed in the lower side wall of the plastic cover at equal intervals; supporting steel sheets are adhered to the interior of the annular buoyancy air bag at equal intervals; and the upper end of the supporting steel sheet abuts against the interior of the groove.

Compared with the prior art, the present disclosure has the following beneficial effects:

firstly, when the automobile runs to fall into a lake and the bottom of the automobile is downward, the first pressure induction switch enables the first high-pressure quick inflation pump to quickly inflate the square buoyancy air bag, the square buoyancy air bag is inflated and unfolded, the square buoyancy air bags at the head and the tail of the automobile body generate buoyancy on the water surface, and the automobile body is prevented from sinking into water;

secondly, when the automobile is overturned laterally or the bottom of the automobile completely rushes upwards into water, the steel ball triggers the second pressure induction switch so that the electric telescopic rod is separated from the heavy metal block, the heavy metal block slides downwards through the sliding plate under the action of gravity to trigger the third pressure induction switch so that all of the second high-pressure quick inflation pumps are started, the annular buoyancy air bag is quickly inflated and then unfolded into an annular shape to surround the side, close to the driving position, of the automobile body, and due to the fact that the annular buoyancy air bag deviates from the side, close to the driving position, of the automobile body, the annular buoyancy air bag inevitably deflects to the horizontal position to float on the water surface when floating upwards, so that the automobile body is overturned laterally in the water, namely the door and the window of the driving position face above the water surface, and a driver in the automobile body can open the door to escape;

thirdly, when the bottom of the automobile body is upwards and the automobile falls into water, the bottom of the heavy metal block drives the sliding plate to slide downwards, the heavy metal block, the rubber block and the connecting rod move relatively, namely, a port of the channel is opened in the process, water overflows into the channel, the liquid induction switch is triggered, and therefore the second high-pressure quick inflation pump is started, the sliding plate is prevented from sliding down to reach the third pressure induction switch to affect the unfolding of the annular buoyancy air bag; and fourthly, the strip-shaped cavities are formed in the positions of the electric elements, the steel balls are placed in the strip-shaped cavities, the electric power storage mechanisms are arranged between the steel balls and the electric elements in a matched mode, in the normal running process of the automobile body, the steel balls bounce up and down in the strip-shaped cavities due to jolt of the automobile body, and the steel balls continuously impact the piezoelectric plates in the electric power storage mechanisms in the up-and-down bouncing process, the piezoelectric plates generate electric energy, and the electric energy is charged into the storage battery blocks through the chargers to be stored, so that the electric elements can still operate when the switches are triggered if the storage battery of the automobile is damaged and cannot supply power.

Reference signs: 1, automobile body; 2, movable cavity; 3, heavy metal block; 4, rubber sealing ring; 5, rubber block; 6, channel; 7, liquid induction switch; 8, connecting rod; 9, strip-shaped sliding groove; 10, third pressure induction switch; 11, sliding plate; 12, electric telescopic rod; 13, first strip-shaped cavity; 14, steel ball; 15, piezoelectric plate; 16, storage battery block; 17, silencing cotton body; 18, electric power storage mechanism; 19, second pressure induction switch; 20, storage cavity; 21, sealing cover; 22, elastic plastic buckle; 23, square buoyancy air bag; 24, first high-pressure quick inflation pump; 25, first one-way air valve; 26, first pressure induction switch; 27, annular storage box body; 28, plastic cover; 29, groove; 30, supporting steel sheet; 31, annular buoyancy air bag; 32, second high-pressure quick inflation pump; 33, inflation hose; 34, second one-way air valve; and 35, second strip-shaped cavity.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Figure 1:
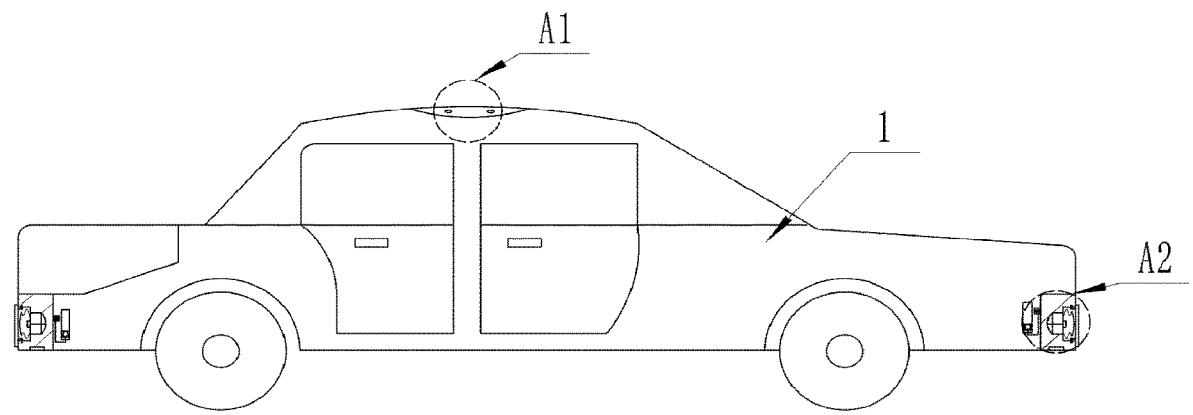
FIG. 1 is an internal structural schematic diagram of the present disclosure.
Figure 2:
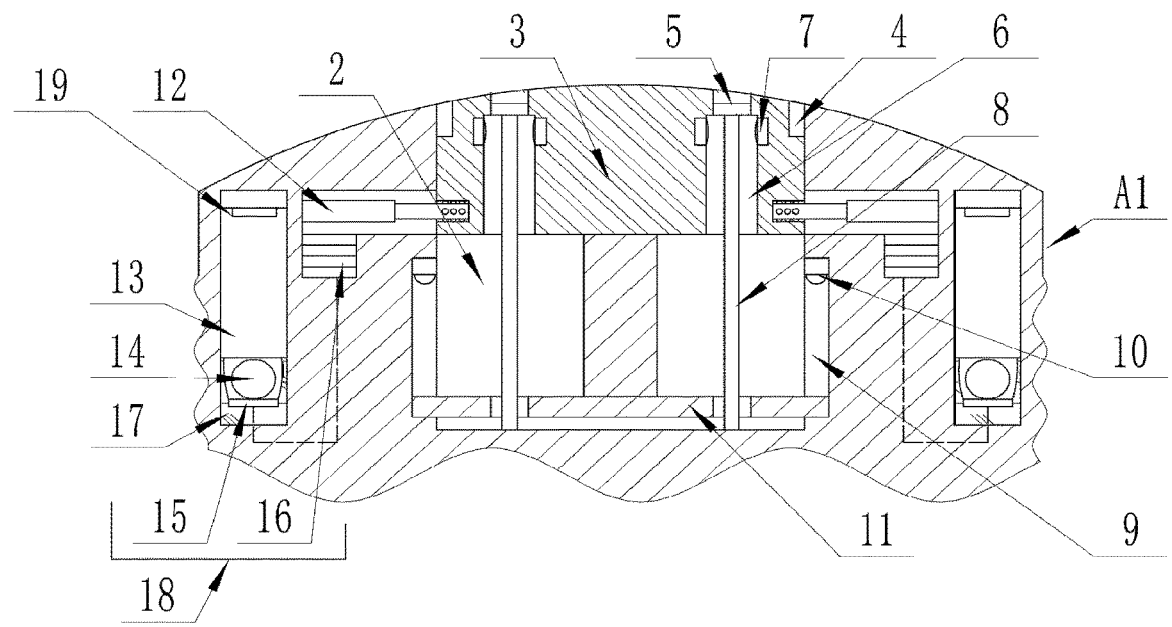
FIG. 2 is a local structural schematic diagram of matched connection of a heavy metal block and the top of an automobile body in the present disclosure.
Figure 3:
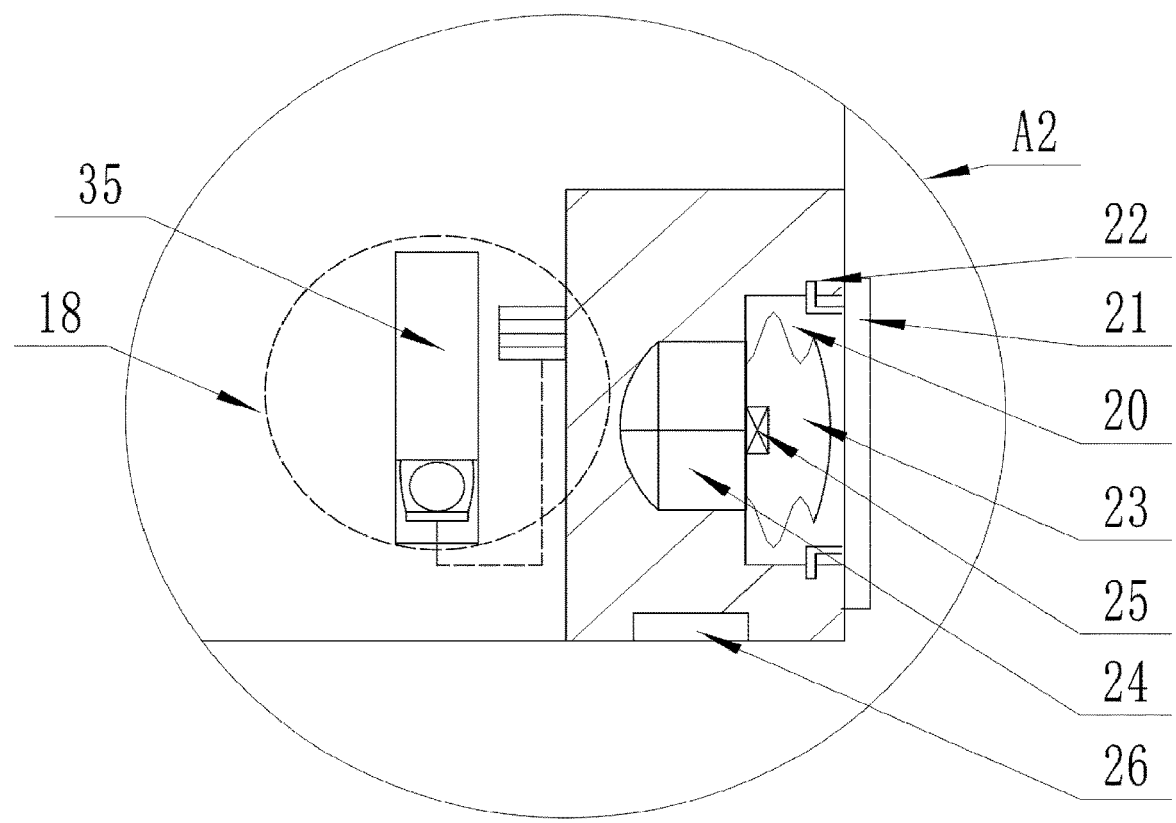
FIG. 3 is a structural schematic diagram of the position where a square buoyancy air bag is located in the present disclosure.
Figure 4:
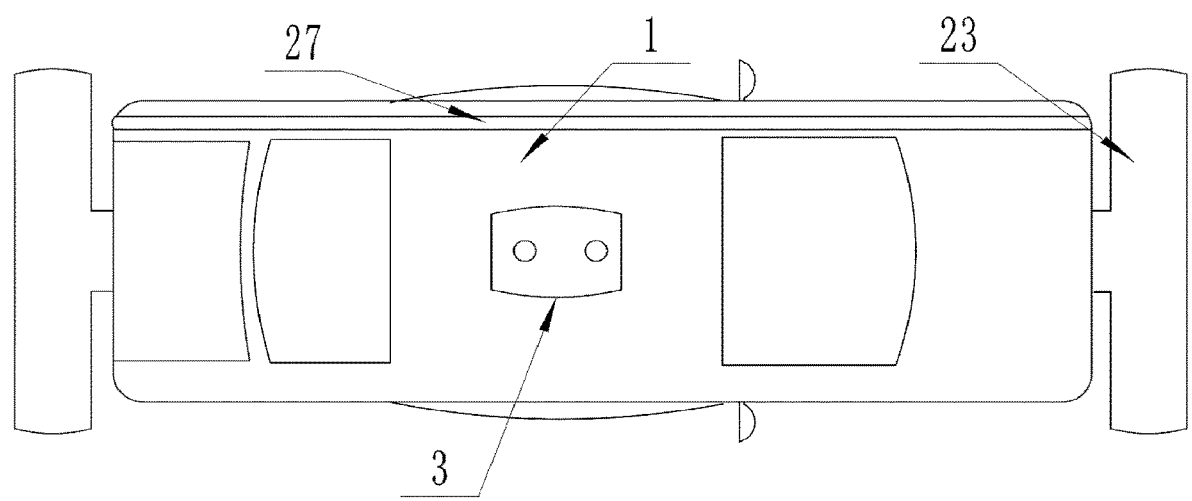
FIG. 4 is a top structural schematic diagram of the automobile body when the square buoyancy air bags are unfolded in the present disclosure.
Figure 5:
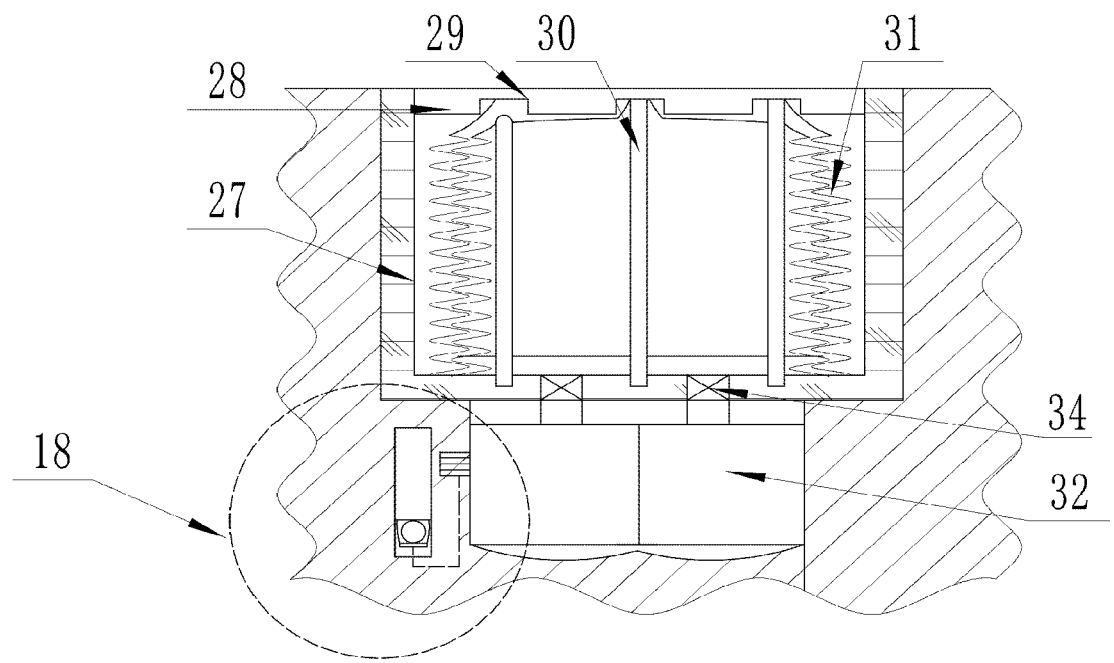
FIG. 5 is a profile structural schematic diagram of an annular buoyancy air bag in an annular storage box body in the present disclosure.
Figure 6:
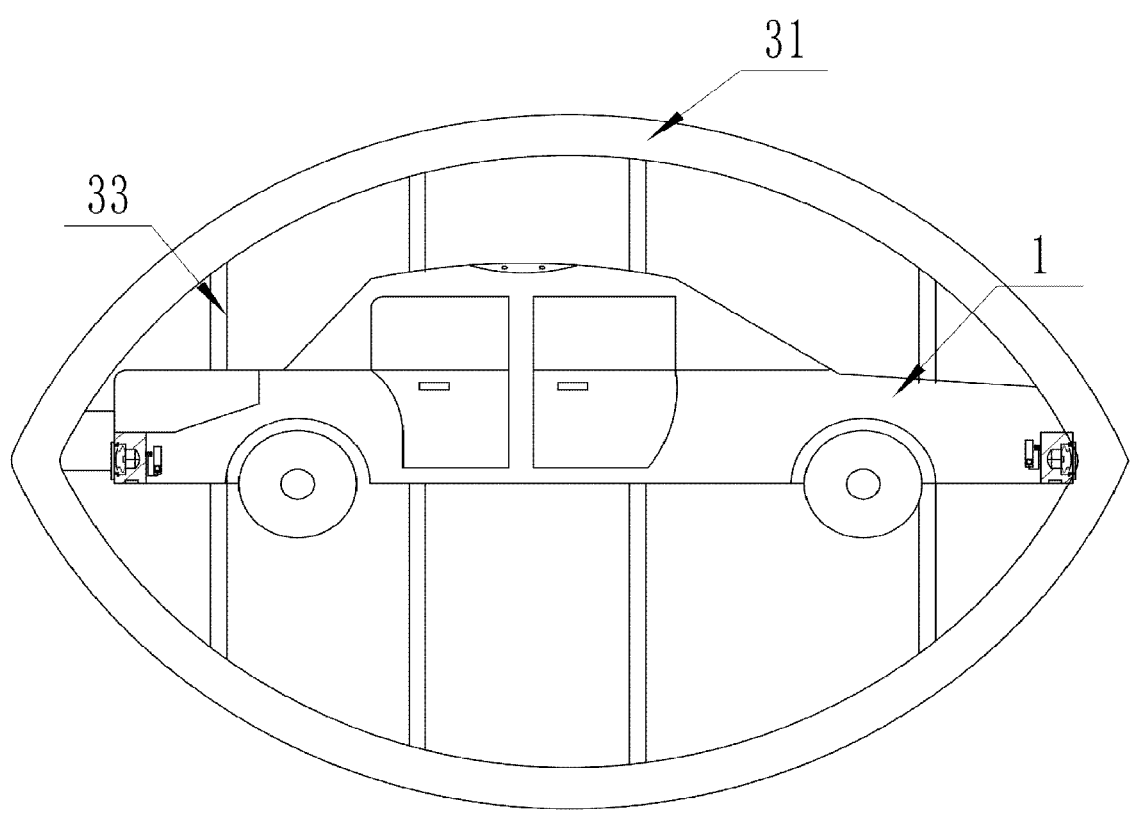
FIG. 6 is a structural schematic diagram when the annular buoyancy air bag is unfolded in the present disclosure.

Referring to FIG. 1 to FIG. 6, a rescue device for adjusting the direction of an automobile falling into water through buoyancy comprises an automobile body 1, storage cavities 2 are formed in the automobile head and the automobile tail of the automobile body 1, a first high-pressure quick inflation pump 24 is embedded in the inner wall of the storage cavity 20, a square buoyancy air bag 23 is arranged in an inner cavity of the storage cavity 20, the square buoyancy air bag 23 and an air outlet of the first high-pressure quick inflation pump 24 are connected through a first one-way air valve 25, the one-way air valve 25 leads to the square buoyancy air bag 23 through the first high-pressure quick inflation pump 24, a sealing cover 21 is arranged at an end port of the storage cavity 20, the inner walls of the upper end and the lower end of the sealing cover 21 are fixedly connected with elastic plastic buckles 22, elastic plastic buckles 22 are fixedly connected to the inner walls of the upper end and the lower end of the sealing cover 21, the elastic plastic buckles 22 are clamped at the upper inner wall and the lower inner wall of the storage cavity 20, first pressure induction switches 26 are embedded in the bottom side walls of the automobile head and the automobile tail of the automobile body 1, and the first pressure induction switch 26 is electrically connected with the first high-pressure quick inflation pump 24 through a storage battery of the automobile. When the automobile runs to fall into a lake and the bottom of the automobile is downward, the bottoms of the head and the tail of the automobile body 1 collide with the water surface. At the moment, the first pressure induction switch 26 generates induction due to the acting force instantaneously borne by the first pressure induction switch 26, then the first pressure induction switch 26 enables the first high-pressure quick inflation pump 24 to quickly inflate the square buoyancy air bag 23, the square buoyancy air bag 23 is inflated and unfolded, and the elastic plastic buckle 22, connected with the storage cavity 20, of the sealing cover 21 is broken through air pressure and rushed out to be unfolded from the storage cavity 20, so that the square buoyancy air bags 23 at the head and the tail of the automobile body 1 generate buoyancy on the water surface, and the automobile body 1 is prevented from sinking into the water. An annular storage box 27 is embedded into a shell of the automobile body 1 and distributed around the automobile body 1. Meanwhile, the annular storage box body 27 is located on the side close to the driving position of the automobile body 1. A plastic cover 28 is connected to an end port of the annular storage box body 27 in a sealed mode. An annular buoyancy air bag 31 is folded and stored in the annular storage box body 27, the parts, located at the head and tail positions of the automobile body 1, of the annular buoyancy air bag 31 are attached and adhered to the inner wall of the annular storage box 27, and the annular buoyancy air bag 31 at the other positions is separated from the inner wall of the annular storage box 27. Second high-pressure quick inflation pumps 32 are fixedly embedded at the bottom in the annular storage box body 27. The second high-pressure quick inflation pumps 32 are distributed along the annular storage box body 27 at equal intervals. Meanwhile, a second one-way air valve 34 is arranged at an air outlet port of the second high-pressure quick inflation pump 32 and is connected with the annular buoyancy air bag 31 through an inflation hose 33. A movable cavity 2 is formed in the outer wall of the top of the automobile body 1. A heavy metal block 3 is embedded in the upper side in the movable cavity 2. Vertical strip-shaped sliding grooves 9 are formed in the positions, close to the lower sides, of the left inner wall and the right inner wall of the movable cavity 2. The bottom of the heavy metal block 3 is horizontally and fixedly connected with the sliding plate 11 through a column body. The left end and the right end of the sliding plate 11 are slidably connected to the bottoms of the strip-shaped sliding grooves 9. Electric telescopic rods 12 are horizontally fixed to the positions, close to the upper ends, of the left inner wall and the right inner wall of the movable cavity 2. The telescopic end of the electric telescopic rod 12 is inserted into the heavy metal block 3 in a penetrating mod, and the electric telescopic rod 12 enables the heavy metal block 3 to be stably located in the movable cavity 2. A vertical first strip-shaped cavity 13 is formed in the position, where the electric telescopic rod 12 is located, of the inner wall of the automobile body 1. A second pressure induction switch 19 is fixedly installed on the top in the first strip-shaped cavity 13. The second pressure induction switch 19 is electrically connected with a telescopic control circuit of the electric telescopic rod 12 through a storage battery of the automobile. A steel ball 14 is placed at the bottom of the inner cavity of the first strip-shaped cavity 13. When the automobile is overturned laterally or the bottom of the automobile is completely upwards flushed into water, the steel ball 14 rolls to the second pressure induction switch 19 along the first strip-shaped cavity 13 under the action of gravity and finally impacts the second pressure induction switch 19, and the second pressure induction switch 19 generates induction to enable the electric telescopic rod 12 to be started to contract. Therefore, the electric telescopic rod 12 is separated from the heavy metal block 3. And at the moment, the bottom of the automobile body 1 is upward, and the heavy metal block 3 is downward, slides downwards through the sliding plate 11 under the action of gravity and is separated from the top of the automobile body 1. A third pressure induction switch 10 is fixedly installed at the top of the strip-shaped sliding groove 9. The third pressure induction switch 10 is electrically connected with all of the second high-pressure quick inflation pumps 32 through a storage battery of the automobile. When the heavy metal block 3 drives the sliding plate 11 to slide downwards due to the fact that the automobile body 1 is upside down, the sliding plate 11 impacts the third pressure induction switch 10 at the end of the strip-shaped sliding groove 9, and the third pressure induction switch 10 enables all of the second high-pressure quick inflation pumps 32 to be started, and the annular buoyancy air bag 31 stored in the annular storage box body 27 is quickly inflated, so that the plastic cover 28 is flushed open through air pressure by the annular buoyancy air bag 31, and the plastic cover 28 is unfolded into an annular shape and surrounds the side, close to the driving position, of the automobile body 1. And for the situation that the bottom of the automobile body 1 faces upwards at the moment, the annular buoyancy air bag 31 generates buoyancy in water, and the annular buoyancy air bag 31 drives the connected position to float upwards due to the fact that the annular buoyancy air bag 31 is deviated from the side of the driving position of the automobile body 1. Meanwhile, due to the annular appearance of the annular buoyancy air bag 31 and the fact that the weight of the automobile body 1 is located on one side of the annular buoyancy air bag 31, the annular buoyancy air bag 31 inevitably deflects to the horizontal position and floats on the water surface, so that the automobile body 1 is overturned laterally in the water, namely, the door and the window at the driving position face the upper portion of the water surface; and therefore, a driver in the automobile body 1 can open the door of the automobile to escape. Meanwhile, general control keys are located at the driving position, so that control is facilitated, and people at other positions of the automobile body 1 are assisted to escape.

Second strip-shaped cavities 35 are vertically formed in the positions where the first high-pressure quick inflation pump 24 and the second high-pressure quick inflation pump 32 are located, and electric power storage mechanisms 18 are arranged at all of the second strip-shaped cavities 35 and the first strip-shaped cavities 13. The electric power storage mechanism 18 comprises a piezoelectric plate 15 and a storage battery block 16. The piezoelectric plates 15 are horizontally installed at the bottoms in the second strip-shaped cavities 35 and the first strip-shaped cavities 13, and a steel ball (14) is arranged in each first strip-shaped cavity (13) in a matched mode. The storage battery block 16 is electrically connected to the positions where the first high-pressure quick inflation pump 24, the second high-pressure quick inflation pump 32 and the electric telescopic rod 12 are located. Meanwhile, the piezoelectric plate 15 is electrically connected with the storage battery block 16 through a charger, namely, in the normal running process of the automobile body 1, the steel balls 14 bounce up and down in the strip-shaped cavities 13 due to jolt of the automobile body 1, and the steel balls 14 continuously impact the piezoelectric plates 15 in the up-and-down bouncing process, the piezoelectric plates 15 generate electric energy, and the electric energy is charged into the storage battery blocks 16 through the chargers to be stored, so that the electric elements can still operate when the switches are triggered if the storage battery of the automobile is damaged and cannot supply power.

Silencing cotton bodies 17 are attached and adhered to the bottom side walls in the first strip-shaped cavity 13 and the second strip-shaped cavity 35. The silencing cotton bodies 17 are used for reducing noise generated when the steel balls 14 bounce, and meanwhile the bouncing amplitude of the steel balls 14 caused by running jolt of the automobile body 1 is reduced.

The first strip-shaped cavity 13 and the second strip-shaped cavity 35 are the same in structure.

The first one-way air valve 25 and the second one-way air valve 34 are the same in structure.

Balls are uniformly embedded on the side wall of the telescopic end of the electric telescopic rod 12, and the electric telescopic rod 12 is convenient to pull away from the heavy metal block 3.

A rubber sealing ring 4 is adhered to the side wall of the upper end of the heavy metal block 3 in a surrounding mode, and is used for sealing the connecting position of the upper end of the heavy metal block 3 and the movable cavity 2 to prevent rainwater from entering.

Channels 6 are vertically formed in the left side and the right side of the heavy metal block 3, and a connecting rod 8 is vertically inserted into the channel 6 in a penetrating mode; the lower end of the connecting rod 8 is connected with the bottom of the inner cavity of the movable cavity 2; a rubber block 5 is arranged at the upper end of the connecting rod 8; the rubber block 5 is embedded at the upper end of the channel 6; liquid induction switches 7 are installed on the left inner wall and the right inner wall of the channel 6 in an embedded mode; and the liquid induction switch 7 is electrically connected with the second high-pressure quick inflation pump 32, and the inner diameter of the channel 6 is larger than the width of the rubber block 5. When the bottom of the automobile body 1 is upwards and the automobile falls into water, the bottom of the heavy metal block 3 drives the sliding plate 11 to slide downwards, the heavy metal block 3, the rubber block 5 and the connecting rod 8 move relatively, namely, a port of the channel 6 is opened in the process, water overflows into the channel 6, the liquid induction switch 7 is triggered, and therefore the second high-pressure quick inflation pump 32 is started, the sliding plate 11 is prevented from sliding down to reach the third pressure induction switch 10 to affect the unfolding of the annular buoyancy air bag 31.

The square buoyancy air bag 23 and the annular buoyancy air bag 31 are both made of high-molecular compression-resistant and wear-resistant materials, so that damage to influence use is avoided.

The inner wall of the strip-shaped sliding groove 9 is coated with a smoothing agent, so that the sliding plate 11 is convenient to slide along the strip-shaped sliding groove 9.

Grooves 29 are formed in the lower side wall of the plastic cover 28 at equal intervals, supporting steel sheets 30 are adhered to the interior of the annular buoyancy air bag 31 at equal intervals; and the upper end of the supporting steel sheet 30 abuts against the interior of the groove 29, and the lower end of the supporting steel sheet 30 abuts against the bottom of the annular storage box 27, the grooves 29 enable the thickness of the corresponding position of the plastic cover 28 to be reduced, and the supporting steel sheets 30 abut against the positions of the grooves 29 for reinforcing and supporting, and meanwhile, when the annular buoyancy air bag 31 is unfolded, the supporting steel sheets 30 can conveniently break through the grooves 29 to rush open the plastic cover 28.

The working principle is as follows: when the automobile runs to fall into a lake and the bottom of the automobile is downward, the bottoms of the head and the tail of the automobile body 1 collide with the water surface, the first pressure induction switch 26 generates induction due to the acting force instantaneously borne by the first pressure induction switch 26, then the first pressure induction switch 26 enables the first high-pressure quick inflation pump 24 to quickly inflate the square buoyancy air bag 23, the square buoyancy air bag 23 is inflated and unfolded, and the elastic plastic buckle 22, connected with the storage cavity 20, of the sealing cover 21 is broken through air pressure and rushed out to be unfolded from the storage cavity 20, so that the square buoyancy air bags 23 at the head and the tail of the automobile body 1 generate buoyancy on the water surface, and the automobile body 1 is prevented from sinking into the water. When the automobile is overturned laterally or the bottom of the automobile is completely upwards flushed into water, the first strip-shaped cavity 13 is upside down, the steel ball 14 rolls to the second pressure induction switch 19 along the first strip-shaped cavity 13 under the action of gravity and finally impacts the second pressure induction switch 19, and the second pressure induction switch 19 generates induction to enable the electric telescopic rod 12 to be started to contract. Therefore, the electric telescopic rod 12 is separated from the heavy metal block 3. At the moment, the heavy metal block 3 faces downwards due to the fact that the automobile body 1 is upside down, the heavy metal block 3 slides downwards through the sliding plate 11 under the action of gravity, the sliding plate 11 is driven to slide along the strip-shaped sliding groove 9 to impact the third pressure induction switch 10, and the third pressure induction switch 10 enables all of the second high-pressure quick inflation pumps 32 to be started, and the annular buoyancy air bag 31 stored in the annular storage box body 27 is quickly inflated, so that the plastic cover 28 is flushed open through air pressure by the annular buoyancy air bag 31, and the plastic cover 28 is unfolded into an annular shape and surrounds the side, close to the driving position, of the automobile body 1. And for the situation that the bottom of the automobile body 1 faces upwards at the moment, the annular buoyancy air bag 31 generates buoyancy in water, and the annular buoyancy air bag 31 drives the connected position to float upwards due to the fact that the annular buoyancy air bag 31 is deviated from the side of the driving position of the automobile body 1. Meanwhile, due to the annular appearance of the annular buoyancy air bag 31 and the fact that the weight of the automobile body 1 is located on one side of the annular buoyancy air bag 31, the annular buoyancy air bag 31 inevitably deflects to the horizontal position and floats on the water surface, so that the automobile body 1 is overturned laterally in the water laterally, namely, the door and the window at the driving position face the upper portion of the water surface; and therefore, a driver in the automobile body 1 can open the door of the automobile to escape. Meanwhile, general control keys are located at the driving position, so that control is facilitated, and people at other positions of the automobile body 1 are assisted to escape. When the bottom of the automobile body 1 is upwards and the automobile falls into water, the bottom of the heavy metal block 3 drives the sliding plate 11 to slide downwards, the heavy metal block 3, the rubber block 5 and the connecting rod 8 move relatively, namely, a port of the channel 6 is opened in the process, water overflows into the channel 6, the liquid induction switch 7 is triggered, and therefore the second high-pressure quick inflation pump 32 is started, the sliding plate 11 is prevented from sliding down to reach the third pressure induction switch 10 to affect the unfolding of the annular buoyancy air bag 31. Moreover, the first strip-shaped cavities 13 and the second strip-shaped cavities 35 are formed in the positions of the electric elements, the steel balls 14 are placed in the strip-shaped cavities, the electric power storage mechanisms 18 are arranged between the steel balls 14 and the electric elements in a matched mode, in the normal running process of the automobile body 1, the steel balls 14 bounce up and down in the strip-shaped cavities due to jolt of the automobile body 1, and the steel balls 14 continuously impact the piezoelectric plates 15 in the electric power storage mechanisms 18 in the up-and-down bouncing process, the piezoelectric plates 15 generate electric energy, and the electric energy is charged into the storage battery blocks 16 through the chargers to be stored, so that the electric elements can still operate when the switches are triggered if the storage battery of the automobile is damaged and cannot supply power.

It needs to be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a device that includes a list of elements not only includes those elements but also includes other elements that are not expressly listed, or further includes elements inherent to such a process, method, article, or device.

Although the embodiments of the present disclosure have already been illustrated and described, various changes, modifications, replacements and transformations can be made by those skilled in the art under the condition of without departing from the principle and the spirit of the present disclosure, and thus the scope of the present disclosure should be restricted by claims and equivalents thereof

What is claimed is:

1. A rescue device for adjusting the direction of an automobile falling into water through buoyancy, comprising an automobile body (1), wherein storage cavities (20) are formed in the automobile head and the automobile tail of the automobile body (1); a first high-pressure quick inflation pump (24) is embedded in the inner wall of the storage cavity (20); a square buoyancy air bag (23) is arranged in an inner cavity of the storage cavity (20); the square buoyancy air bag (23) and an air outlet of the first high-pressure quick inflation pump (24) are connected through a first one-way air valve (25); a sealing cover (21) is arranged at an end port of the storage cavity (20); the inner walls of the upper end and the lower end of the sealing cover (21) are fixedly connected with elastic plastic buckles (22); the elastic plastic buckles (22) are clamped at the upper inner wall and the lower inner wall of the storage cavity (20); first pressure induction switches (26) are embedded in the bottom side walls of the automobile head and the automobile tail of the automobile body (1); the first pressure induction switch (26) is electrically connected with the first high-pressure quick inflation pump (24); a shell of the automobile body (1) is internally provided with an annular storage box body (27), the annular storage box body (27) is distributed around the automobile body (1), and the annular storage box body (27) is located on the side close to the driving position of the automobile body (1); an end port of the annular storage box body (27) is sealed through a plastic cover (28); an annular buoyancy air bag (31) is arranged in an inner cavity of the annular storage box body (27), and the annular buoyancy air bag is folded and stored; second high-pressure quick inflation pumps (32) are arranged at the bottom of the inner cavity of the annular storage box body (27); a second one-way air valve (34) is arranged at an air outlet port of the second high-pressure quick inflation pump (32) and is connected with the annular buoyancy air bag (31) through an inflation hose (33); a movable cavity (2) is formed in the outer wall of the top of the automobile body (1); a heavy metal block (3) is embedded in the upper side in the movable cavity (2); vertical strip-shaped sliding grooves (9) are formed in the positions, close to the lower sides, of the left inner wall and the right inner wall of the movable cavity (2); a sliding plate (11) is horizontally fixed at the bottom of the heavy metal block (3); the left end and the right end of the sliding plate (11) are slidably connected to the bottoms of the strip-shaped sliding grooves (9); electric telescopic rods (12) are horizontally fixed to the positions, close to the upper ends, of the left inner wall and the right inner wall of the movable cavity (2); the telescopic end of the electric telescopic rod (12) is inserted into the heavy metal block (3) in a penetrating mode; a vertical first strip-shaped cavity (13) is formed in the position, where the electric telescopic rod (12) is located, of the inner wall of the automobile body (1); a second pressure induction switch (19) is arranged at the top of an inner cavity of the first strip-shaped cavity (13); the second pressure induction switch (19) is electrically connected with the electric telescopic rod (12); and a steel ball (14) is placed at the bottom of the inner cavity of the first strip-shaped cavity (13).

2. The rescue device for adjusting the direction of an automobile falling into water through buoyancy according to claim 1, wherein vertical second strip-shaped cavities (35) are formed in the positions, where the first high-pressure quick inflation pump (24) and the second high-pressure quick inflation pump (32) are located, of the inner wall of the automobile body (1), and all of the second strip-shaped cavities (35) and the first strip-shaped cavities (13) are provided with electric power storage mechanisms (18); the electric power storage mechanism (18) comprises a piezoelectric plate (15) and a storage battery block (16), the piezoelectric plates (15) are horizontally installed at the bottoms of the inner cavities of the first strip-shaped cavities (13) and the second strip-shaped cavities (35), and the steel ball (14) is arranged in the inner cavity of each second strip-shaped cavity (13) in a matched mode; the storage battery block (16) is electrically connected with the first high-pressure quick inflation pump (24), the second high-pressure quick inflation pump (32) and the electric telescopic rod (12); and the piezoelectric plate (15) is electrically connected with the storage battery block (16) through a charger.

3. The rescue device for adjusting the direction of an automobile falling into water through buoyancy according to claim 2, wherein silencing cotton bodies (17) are arranged on the bottom side walls of the inner cavities of the first strip-shaped cavity (13) and the second strip-shaped cavity (35).

4. The rescue device for adjusting the direction of an automobile falling into water through buoyancy according to claim 1, wherein balls are uniformly embedded on the side wall of the telescopic end of the electric telescopic rod (12).

5. The rescue device for adjusting the direction of an automobile falling into water through buoyancy according to claim 1, wherein a rubber sealing ring (4) is adhered to the side wall of the upper end of the heavy metal block (3) in a surrounding mode.

6. The rescue device for adjusting the direction of an automobile falling into water through buoyancy according to claim 1, wherein channels (6) are vertically formed in the heavy metal block (3), and a connecting rod (8) is vertically inserted into the channel (6) in a penetrating mode; the lower end of the connecting rod (8) is connected with the bottom of the inner cavity of the movable cavity (2); a rubber block (5) is arranged at the upper end of the connecting rod (8); the rubber block (5) is embedded at the upper end of the channel (6); liquid induction switches (7) are installed on the left inner wall and the right inner wall of the channel (6) in an embedded mode; and the liquid induction switch (7) is electrically connected with the second high-pressure quick inflation pump (32), and the inner diameter of the channel (6) is larger than the width of the rubber block (5).

7. The rescue device for adjusting the direction of an automobile falling into water through buoyancy according to claim 1, wherein the inner wall of the strip-shaped sliding groove (9) is coated with a smoothing agent.

8. The rescue device for adjusting the direction of an automobile falling into water through buoyancy according to claim 1, wherein grooves (29) are formed in the lower side wall of the plastic cover (28) at equal intervals; supporting steel sheets (30) are adhered to the interior of the annular buoyancy air bag (31) at equal intervals; and the upper end of the supporting steel sheet (30) abuts against the interior of the groove (29).

* * * * *